Aug. 10, 1943.  D. H. HILL  2,326,221
FUEL OIL BURNER
Filed May 22, 1941
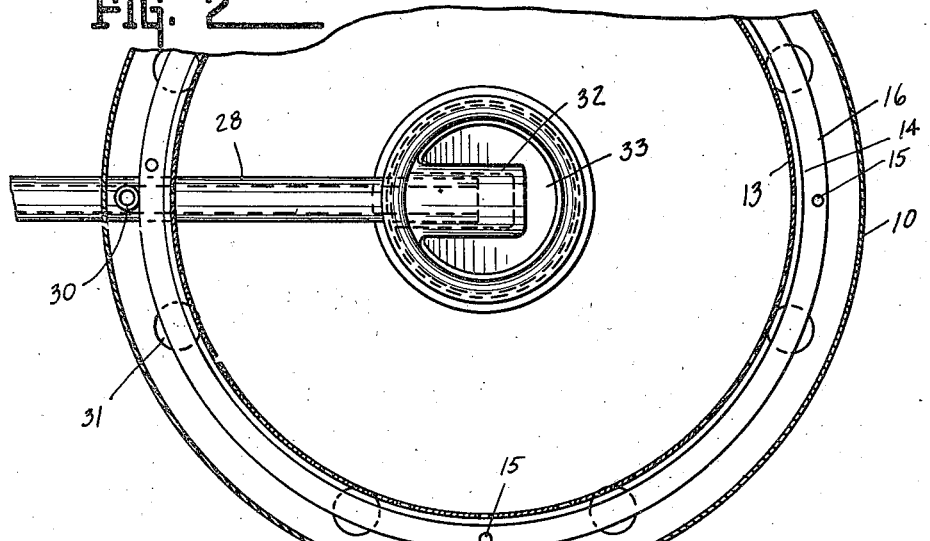
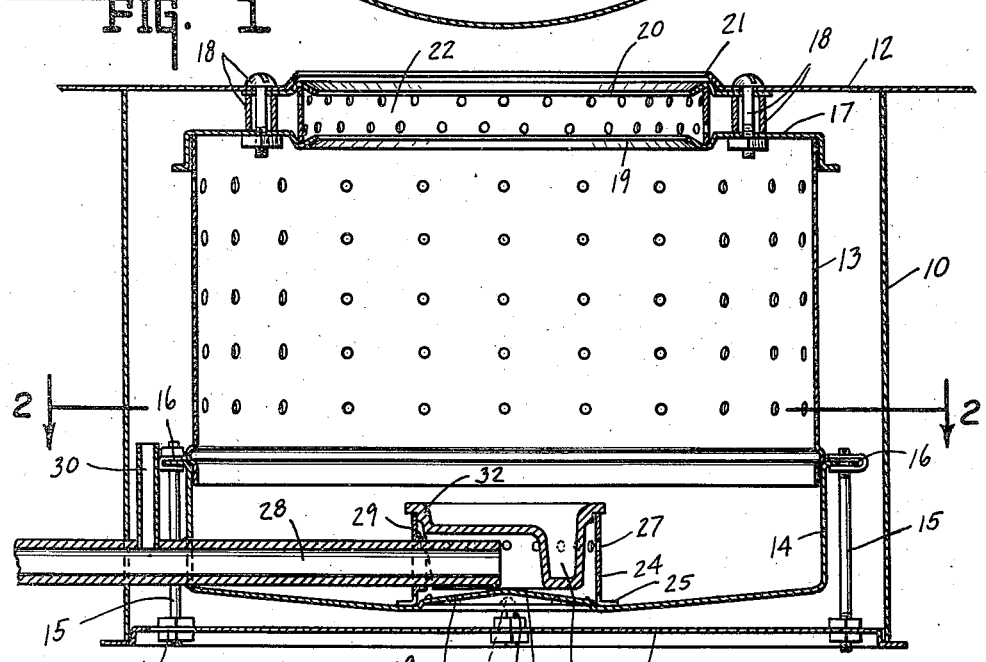
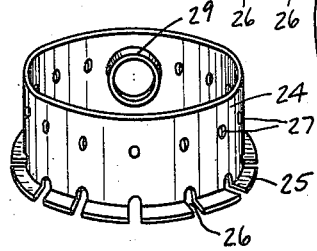
INVENTOR.
DEWEY H. HILL.
BY *Lockwood, Goldsmith & Galt,*
ATTORNEYS.

Patented Aug. 10, 1943

2,326,221

UNITED STATES PATENT OFFICE 2,326,221

FUEL OIL BURNER

Dewey H. Hill, Macomb, Ill., assignor to Globe American Corporation, Kokomo, Ind., a corporation Application May 22, 1941, Serial No. 394,598

1 Claim. (Cl. 158—91)

This invention relates to burners for fuel oil of the variety commonly known as "pot type," and wherein it has been found difficult to secure good combustion over a wide range of combustion from high to low flame. This is due in part to the failure of this type of burner to deliver an adequate supply of air into the oil vapors and secure intimate mixing therewith when the flame is burning low.

The object of the invention is to provide a burner of this type wherein there is provided an apertured chamber or distributor sleeve enclosing the oil and air outlet from the intake pipe, coupled with a protector cover formed to displace a portion of the air within the sleeve. For this purpose, the sleeve is provided with a lower series of openings through which both oil and air escape in intimate contact for obtaining proper combustion, while the combined air and oil vapors pass through a series of upper openings in the sleeve. A cover plate having an inwardly dished body portion is so formed as to extend over and cover the sleeve, as well as extend downwardly therein to reduce the flame below it to prevent flashing back of the flame to within the sleeve.

The full nature of the invention will be understood from the accompanying drawing and the following description and claim:

Fig. 1 is a central vertical section through the burner. Fig. 2 is a section taken on the line 2—2 of Fig. 1. Fig. 3 is a perspective view of the burner sleeve.

In the drawing there is shown a fuel burner having an outside casing 10, a bottom plate 11 and a top plate 12. Within the casing and spaced inwardly from the walls thereof there is a perforated burner drum 13 having a burner pan 14 secured about the lower end thereof and spaced upwardly from the bottom plate 11. The drum 13 with its pan 14 are supported in spaced relation to the casing 10 and bottom plate 11 by the supporting studs 15 suitably spaced about the burner pan and removably secured to the bottom plate 11 and an out-turned flange 16 of the pan.

The drum 13 is provided with a cover plate 17 secured to and spaced from the top plate 12 by the bolts and spacer sleeves 18. Said cover plate 17 is formed with a central opening having an inwardly-extending dished flange 19 conforming to and in alignment with a ring 20 spaced upwardly therefrom and secured to the plate 12 by said bolts and spacer sleeves 18. Also, the top plate 12 is provided with a corresponding aperture having an upwardly extending flange 21 surrounding the ring 20. Clamped between the dished flanges 19 and 20 there is an annular perforated collar 22. This assembly provides a flue for the passage of hot gases from the burner, while the perforations in the collar 22 and drum 13 permit circulation of the hot gases within the casing 10 for effectively heating it to promote combustion.

The bottom of the burner pan 14 slopes downwardly from the peripheral wall to adjacent the central portion which is formed with an annular raised section 23. Supported on the bottom of the pan and surrounding the raised section 23 there is a distributor sleeve 24. Said sleeve is provided with a bottom supporting flange 25 having a series of apertures 26 extending thereabout substantially flush with the bottom of the pan. Intermediate the top and bottom of the sleeve there is also formed a series of perforations 27. Extending inwardly through the wall of the sleeve and terminating at about its central portion, there is an oil inlet pipe 28 which passes through and is supported by an inwardly-extending collar 29 formed in the wall of the sleeve, said pipe also extending inwardly through the wall of the casing and being supported thereby. Said oil inlet pipe is provided with an upstanding air inlet nipple 30 between the walls of the casing and pan so that its inlet end may receive preheated air from about the perforated drum 13. Also the bottom plate 11 of the casing is provided with openings 31 immediately below the air inlet 30.

The distributor sleeve 24 is provided with a cast iron cover plate 32 which is flanged to be supported about the upper edge of said sleeve. Said plate is dished inwardly to provide a body portion 33 embracing the inlet end of the pipe 28, but spaced from the perforated wall of the sleeve to thereby displace a portion of the air and reduce the air volume within the sleeve to prevent flashing back of the flame.

In operation of the above-described burner, only sufficient oil is permitted to pass through the inlet pipe as to maintain an air column thereabove fed from the air inlet 30. Thus, ample air is delivered into the distributor sleeve with the oil to support proper combustion both in the operation of a low flame and also a high flame. The oil is distributed radially by the raised section 23 of the burner pan to the series of openings 26 from which the mixture emerges for combustion about the sleeve, while the gaseous mixture of vapor and air escapes for combustion from the sleeve through the perforations 27.

The invention claimed is:

A liquid fuel burner comprising a burner pan, a perforated drum coextensive with said pan and mounted thereabove, the top plate for said drum having a central aperture, a perforated distributor sleeve mounted centrally of said drum and pan and supported upon said burner pan, a fuel intake pipe extending through the wall of said pan and said sleeve with its discharge end centrally thereof, and a cover plate for said sleeve having a downwardly extending dished body portion extending over and about the discharge end of said pipe but spaced therefrom and from the wall of said sleeve.

DEWEY H. HILL.